United States Patent
Braden

(10) Patent No.: US 9,668,138 B2
(45) Date of Patent: *May 30, 2017

(54) DIFFERENTIATED ACCESS FOR MOBILE DEVICE

(71) Applicant: Miles Jennings Braden, San Diego, CA (US)

(72) Inventor: Miles Jennings Braden, San Diego, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/162,448

(22) Filed: May 23, 2016

(65) Prior Publication Data

US 2016/0269906 A1    Sep. 15, 2016

Related U.S. Application Data

(63) Continuation-in-part of application No. 14/791,482, filed on Jul. 6, 2015, now Pat. No. 9,350,847, which is a continuation of application No. 14/280,568, filed on May 17, 2014, now Pat. No. 9,104,850.

(51) Int. Cl.
| | |
|---|---|
| H04W 12/08 | (2009.01) |
| H04M 1/673 | (2006.01) |
| H04L 29/08 | (2006.01) |
| G06F 21/31 | (2013.01) |
| G06F 21/62 | (2013.01) |
| H04L 29/06 | (2006.01) |
| G06F 3/06 | (2006.01) |
| H04W 88/02 | (2009.01) |

(52) U.S. Cl.
CPC ............ *H04W 12/08* (2013.01); *G06F 21/31* (2013.01); *G06F 21/62* (2013.01); *H04L 63/083* (2013.01); *H04L 63/105* (2013.01); *H04L 67/306* (2013.01); *H04M 1/673* (2013.01); *G06F 3/0637* (2013.01); *H04W 88/02* (2013.01)

(58) Field of Classification Search
CPC ..................................................... G06F 3/0637
USPC ......................................................... 726/19
See application file for complete search history.

(56) References Cited

U.S. PATENT DOCUMENTS

| | | |
|---|---|---|
| 7,086,008 B2 | 8/2006 | Capps et al. |
| 2002/0133590 A1 | 9/2002 | McBrearty et al. |
| 2004/0203768 A1* | 10/2004 | Ylitalo ............... H04M 1/72572 455/435.1 |
| 2009/0265773 A1 | 10/2009 | Schultz |
| 2011/0289138 A1 | 11/2011 | Turakhia |
| 2011/0321156 A1 | 12/2011 | Smith |
| 2013/0318618 A1 | 11/2013 | Nguyen et al. |
| 2014/0066020 A1 | 3/2014 | Sadhvani et al. |
| 2014/0090021 A1 | 3/2014 | Berkovitz et al. |

* cited by examiner

*Primary Examiner* — Jacob Lipman

(57) ABSTRACT

Mobile devices and methods are disclosed for providing privacy and confidentiality of information through the provision of multiple profiles that control access to the information, and operation of the mobile device in accordance with a profile chosen by entry of an associated access code.

18 Claims, 10 Drawing Sheets

DIFFERENTIATED ACCESS FOR MOBILE DEVICE

This application is a continuation-in-part of application Ser. No. 14/791,482, filed Jul. 6, 2015 entitled "Differentiated Access for Mobile Device," which is a continuation of application Ser. No. 14/280,568, filed May 17, 2014, entitled "Differentiated Access for Mobile Device", now U.S. Pat. No. 9,104,850, issued Aug. 11, 2015.

FIELD

The present work relates generally to mobile data processing devices (mobile devices) and, more particularly, to controlling access to information and functionality normally accessible in a mobile device.

BACKGROUND

The normal login process for a mobile device such as a mobile phone involves entry of a password for a single user at an interface with/to the device.

FIG. 1 diagrammatically illustrates procedures typically associated with logging in to a conventional mobile device having an Android Operating System. At module 2, upon device startup, the initialization process, unit, launches (spawns) getty, a program that, among other things, sets the device configuration for the user and spawns a login process. At module 4, getty launches the login process, which first prompts the user to enter a password for access to the mobile device. At module 6, with a proper password entered, getty continues to execute the login process. Module 8 represents creation, by the login process, of a user shell in user space for the user that has logged in. This user shell, unique to the user, implements known configuration information for the user, for example, a particular text font, file histories, a default editor, etc. This configuration information resides in a folder known as the etc folder (see module 10). Module 12 represents a shell prompt that signals completion of the login process, indicating that the shell has been created, and programs and processes are ready for execution in accordance with the shell.

Applicable reference numbers have been carried forward.

DETAILED DESCRIPTION

Figure 1:
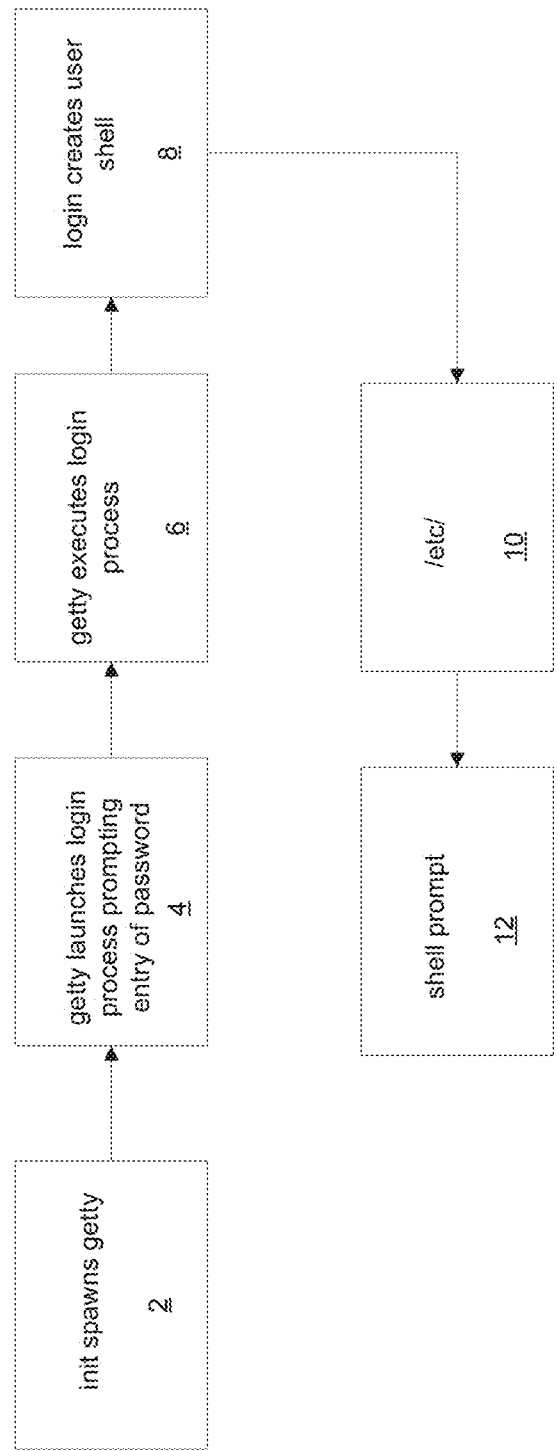
FIG. 1 diagrammatically illustrates procedures typically associated with a login process in the prior art.
Figure 2:
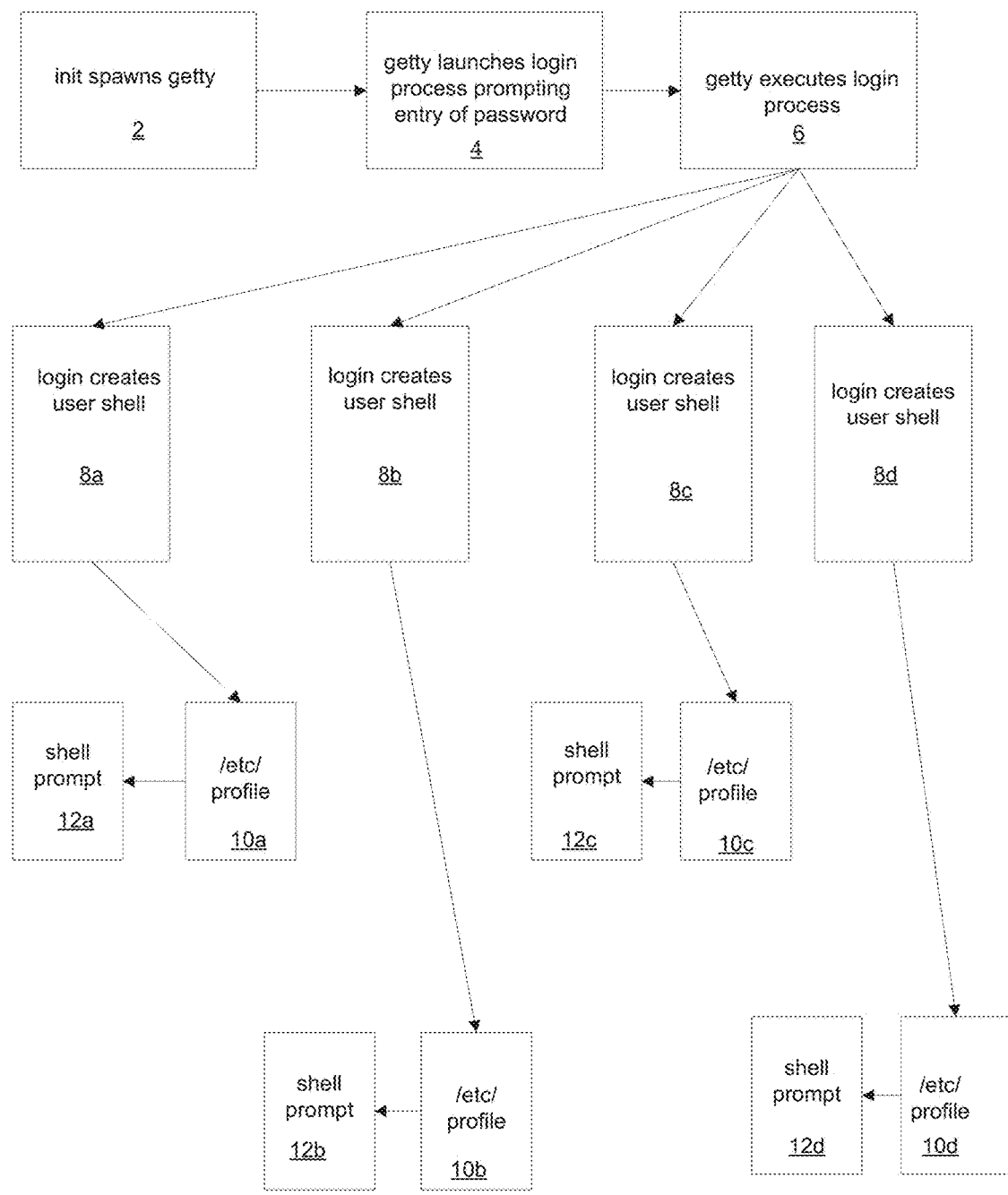
FIG. 2 diagrammatically illustrates a modification of FIG. 1 according to a first example embodiment.

Example embodiments according to the subject invention provide a login process that is modified relative to that described above in order to allow the creation of multiple user shells, wherein each user shell has associated therewith a profile that defines user access to the device. More specifically, the profile specifies which device applications, alerts, notifications, other information, etc., will be accessible and/or perceptible to the user. Considering the example of a mobile device using the android operating system or a modified Linux operating system, the login process can be readily changed using well known rules for modifying the Linux login process. FIG. 2 diagrammatically illustrates a modification of FIG. 1 according to a first example embodiment. At module 6A, the getty executes a modified login process that provides for creation of a plurality of user shells, with each user shell having at least one associated user profile derived from a master profile of the mobile device. As used herein, a master profile is a default profile that provides access to and visibility of all applications and information available in the mobile device. The user shells are designated 8a-8d, and are respectively associated with modules 10a-10d (including profile information) and modules 12a-12d (shell prompts).

Figure 3:
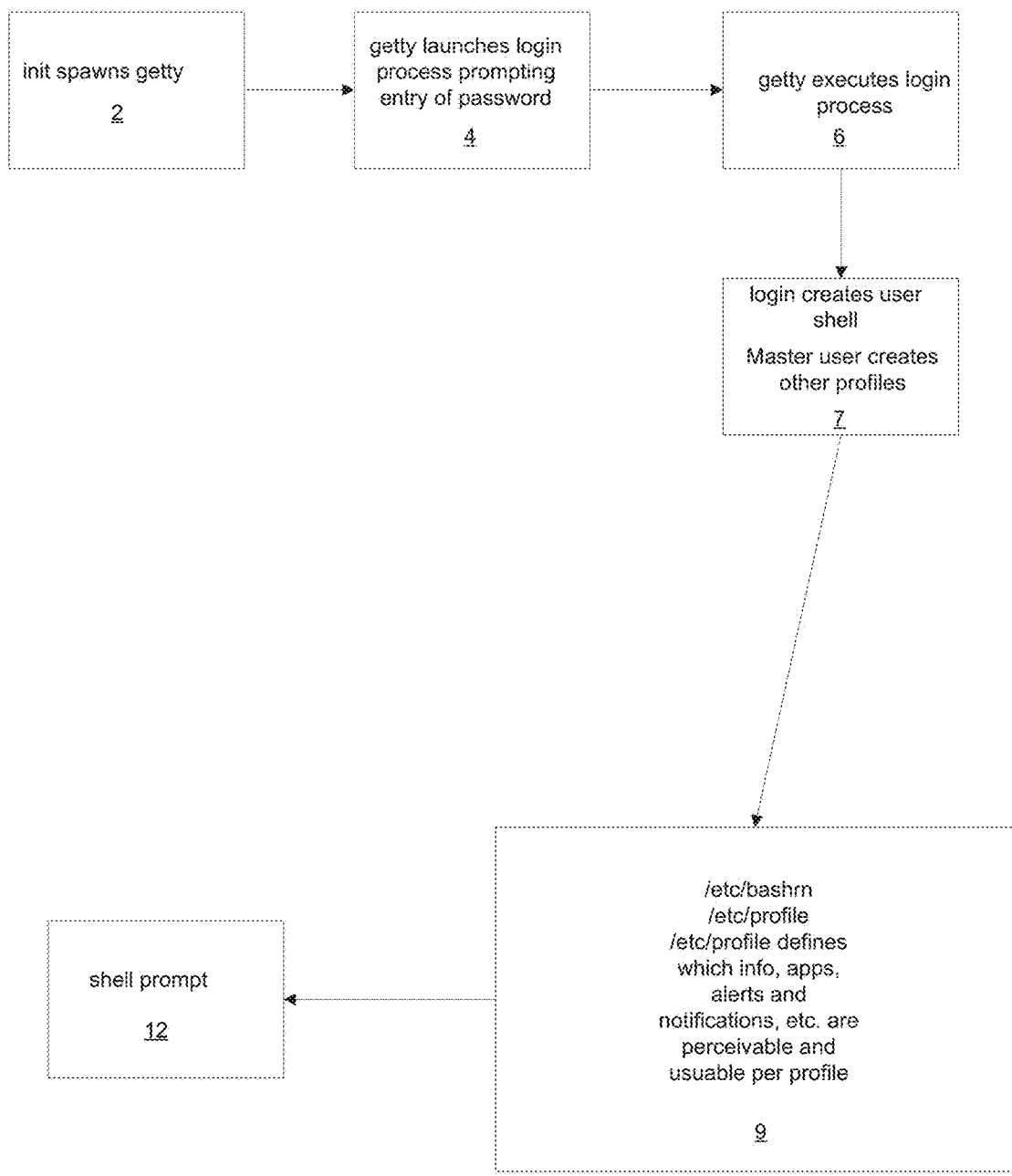
FIG. 3 diagrammatically illustrates a second example embodiment.

Some example embodiments of the subject invention provide a modified login process that creates only a single user shell which has an associated profile configuration file that defines several of the profiles shown in FIG. 2. FIG. 3 diagrammatically illustrates a second example embodiment in which, at 6B, the getty executes a modified login process that provides for creation of a single user shell using a master profile at module 7. In module 9, a profile folder (located in the Android etc folder in this embodiment) contains definitions for each of a plurality of user profiles, that specify which information, applications, alerts and notification, etc. are perceivable and usable under the profile (see also modules 10a-10d of FIG. 2). At module 12, the shell prompt signals completion of the login process, indicating programs and processes are ready for execution in accordance with any of the various user profiles defined in the profile folder, when a user inputs a particular profile selection to the mobile device through the device interface.

According to one aspect of the invention, privacy concerns associated with a mobile device, including a smart phone, iPad, iPod, tablet and the like are addressed by an operating system configured to run on the mobile device or by one or more applications that run on the mobile device. The invention is also well suited to address privacy concerns while sharing a mobile device with others. An access password that allows access to the mobile device also controls the level of access within the mobile device.

In one example embodiment of the invention, a Master Mode application will run as part of the login process. This allows the operator to manage profiles for, for instance, an android device. When the operator logs in with a Master Mode password/ passcode/access code, the operator will have access to the Master Mode application, which allows management of profiles and passwords. As used herein throughout, the terms password, passcode and access code are used interchangeably. The operator will be prompted to create a name for the profile, then a password. The operator is then prompted to select the apps that will be supported in that profile. As an example, the operator can create an entertainment profile which provides access only to multimedia apps, and/or a business profile that provides access only to apps that pertain to financials or related presentations; indeed, the number of possible profiles pertinent to a particular use by the operator is nearly without limit. In addition, the operator may, for instance, create a public profile in which camera, instant messages (IM), email, and social media applications (e.g., Instagram™ Facebook™, Twitter™, etc.) and other such apps will be blocked from view or at least inaccessible for use.

In another embodiment, the Master Mode application resides in a suitably modified android operating system. The login process calls a modified password handler that has been modified relative to the conventional password handler such that, when the Master Mode password is entered, a menu will be made available to the operator that will allow the operator to name and create profiles, and assign corresponding profile passwords. In contrast, upon entry of a password that is not the Master Mode password, no menu for profile management appears. The user is allowed to proceed with normal android operating system access in accordance with the constraints defined by the profile associated with the password.

When the master profile is operative, the user has access to a Call Block editor for specifying blocked incoming and outgoing phone numbers and SMS/text message numbers. However, access to the Call Block editor may be prevented when one or more other profiles are operative, depending on the profile definition. Even if a given profile does not explicitly prevent access to the Call Block editor, some embodiments will nevertheless prevent access to the Call Block editor if the profile prevents access to phone and/or SMS/text services.

In some embodiments, an access procedure to a mobile device may generally follow the familiar procedure that users experience with a personal computer (PC). However, in response to entry of the Master Mode password, the access procedure allows the device owner to configure a number of profiles having distinct passwords. The visibility, functionality access and/or awareness of defined device properties may be configured during operation under the Master Mode password. In configuring the profiles, the device owner may determine, for each profile, access, visibility and awareness of applications on the mobile device. This is contemplated as including limiting access to certain types of connectivity such as Bluetooth™ or Wi-Fi™ through which an automatic connection might otherwise be established. For instance, while operating under a particular profile, Bluetooth™ connectivity with the mobile device may be prevented under certain profiles so as to ensure privacy while in a motor vehicle. As a further example, while operation under the master profile provides access to all applications, data etc., on the mobile device, other profiles can prevent, for example, seeing and/or hearing alerts, and/or access, etc., to incoming text messages, e-mails, etc. More generally, each profile such as shown in FIGS. 2 and 3 is in all cases a subset of the master profile, because the access, visibility and awareness of applications and information, as defined by each profile, is a subset of the (complete) access, visibility and awareness defined by the master profile. The master profile permits unlimited access/visibility/awareness of the functionalities of the device, and all other profiles limit, in some way, access/visibility/awareness of the functionalities of the device.

Figure 4:
FIG. 4 diagrammatically illustrates one example implementation of a login process according to example embodiments.

One implementation of a login process modified according to example embodiments is diagrammatically illustrated in FIG. 4, where application APP 32 is illustrated along with other applications, (APP 34 and APP 36) juxtaposed next to the kernel 88. APP 32, in particular, governing passwords, resides in the user space 100 of an operating system such as the Android operating system. For any Open Source-type operating system, user space 100 lies outside of kernel 88 (e.g., Linux kernel, Android kernel, etc.). The modified login process calls password handler 62 which handles password functionality and, in various embodiments, is implemented in software, hardware or a combination thereof. The password handler 62 is modified (relative to the prior art password handler) such that when the master mode password is entered, a menu represented by element 64 is generated, preferably on a display of the mobile device, and is made available to the operator to allow, at 66, creation of profiles 72 and associated passwords.

In one example embodiment, a profile may exclude e-mail from a designated person from being visible, while operating the mobile device, by placing such e-mail messages in a hidden file, namely, a file whose contents or existence will not be apparent when operating a device under a particular profile. This may be accomplished through a rule set up in connection with a macro run at the beginning of a change of profiles. The macro causes existing e-mail messages, as designated by the profile parameters, to be placed in the hidden file. While the device is operating under a designated profile, messages to and from a designated e-mail address are placed within the hidden file, and corresponding reception alerts are not presented to the user.

In another embodiment, in addition to a system cache for e-mail, each profile has its own private storage for an e-mail cache that corresponds to the profile's e-mail preferences, although, the e-mail credentials for each profile may be the same. Each profile is expressed by its profile preferences. Profile preferences, as used in this instance, refer to what a profile user is allowed to see or not see (e.g., e-mails to/from certain users, e-mail subjects, etc.) In connection with switching profiles from a current profile to a new profile, the new profile may have its own cache from a previous cache. Further, in connection with switching profiles, the preferences of the current profile are deactivated in the e-mail system. The current system cache, including the current e-mail credentials, is copied to the e-mail cache private storage for the profile being left. In activating a new profile, all of the e-mail messages and e-mail message notifications in the system cache are deleted after copying them to the current (soon to be previous) profile's e-mail storage. The e-mail messages and e-mail message notifications from the newly activated profile's email private storage, including the e-mail credentials of the newly activated profile, is then copied to the e-mail system cache and the new profile's e-mail preferences are activated/restored to the e-mail system. The foregoing embodiment regarding private e-mail cache storage for each profile is contemplated for use with any type of e-mail protocol including Post Office Protocol (POP) and Internet Message Access Protocol (IMAP). Once the profile switch takes place from the current profile to the new profile, the e-mail preferences of the new profile are implemented. For instance, notices of email from selected individuals are not displayed and certain downloaded messages and e-mail message notifications may be sorted out and placed in a hidden file. Other e-mail notifications and downloaded messages are displayed and consequently, the e-mails and notifications shown for Profile A may be quite a bit different from the e-mails and notifications shown for Profile B.

Figure 5:
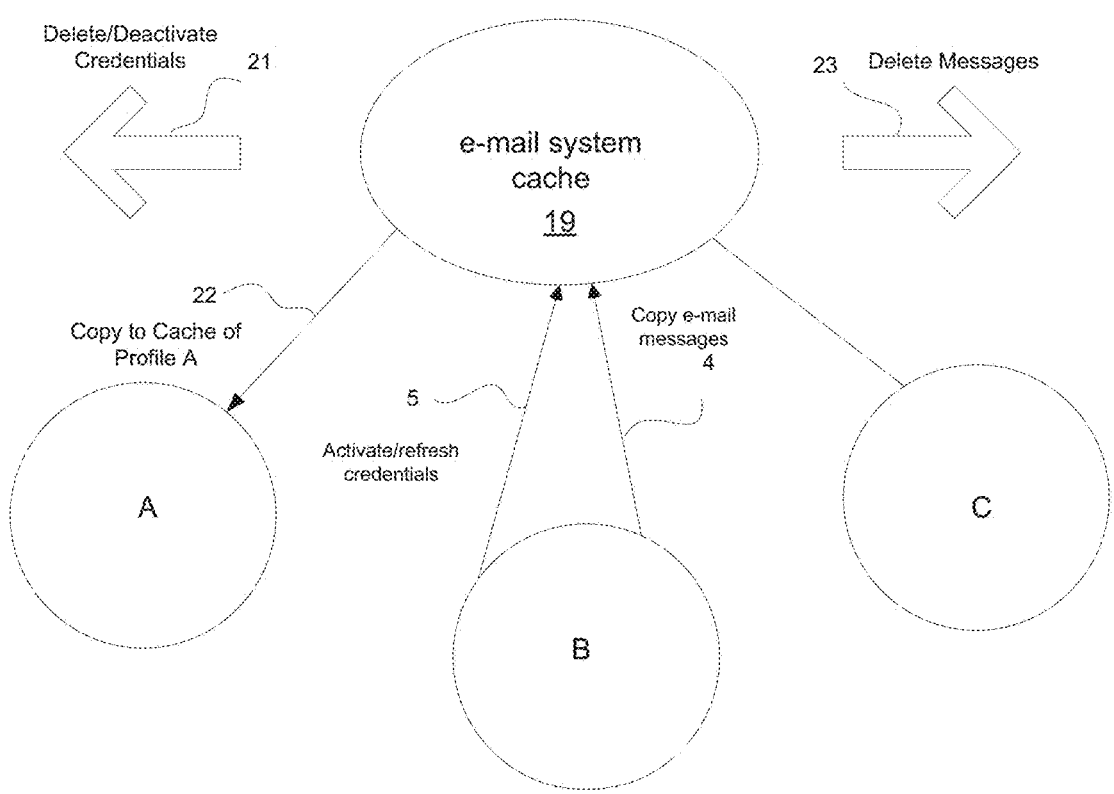
FIG. 5 is a diagram showing an e-mail system cache together with private storage for an e-mail cache for each of Profiles A, B and C.
Figure 6:
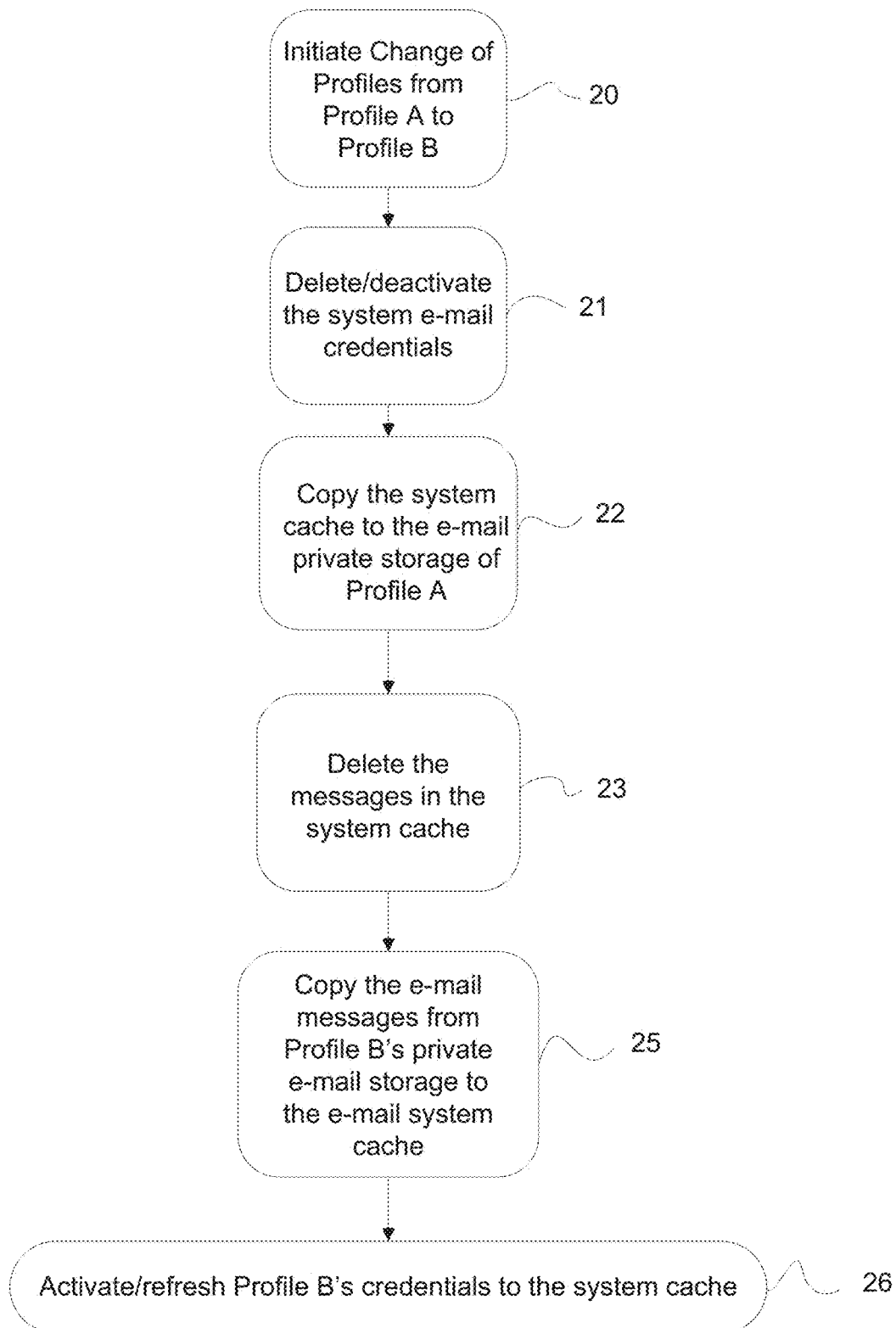
FIG. 6 illustrates a flowchart showing an implementation of e-mail system regarding private e-mail cache storage for a respective profile.

FIG. 5 is a diagram showing the e-mail system 19 cache together with private storage for an e-mail cache for each of Profiles A, B and C (each profile, with storage, being represented as A, B, C respectively) with FIG. 5 further diagramming the steps shown in FIG. 6. FIG. 6 illustrates a flowchart showing an implementation of the foregoing embodiment regarding private e-mail cache storage for each profile as it relates to FIG. 5 in connection with switching from Profile A to Profile B. Profile C may represent the master profile wherein all e-mail messages and e-mail message notifications among profiles are accessible. With reference to FIG. 5 and FIG. 6, 20 is a step representing the initiation of a change of profiles from Profile A to Profile B. At step 21, Profile A's email preferences are deactivated in the e-mail system. Next, at step 22, the system cache, including the e-mail credentials in the system cache, is copied to the e-mail private storage of Profile A. The system cache including Profile A's e-mail messages and e-mail message notifications deleted at step 23. Thereafter, in step 25 the e-mail cache including e-mail credentials and e-mail messages and notifications from Profile B's private e-mail storage is copied to the e-mail system cache. Next, at step 26, Profile B's e-mail credentials are activated/restored in the system cache and Profile B's preferences are activated in the e-mail system.

Figure 7:
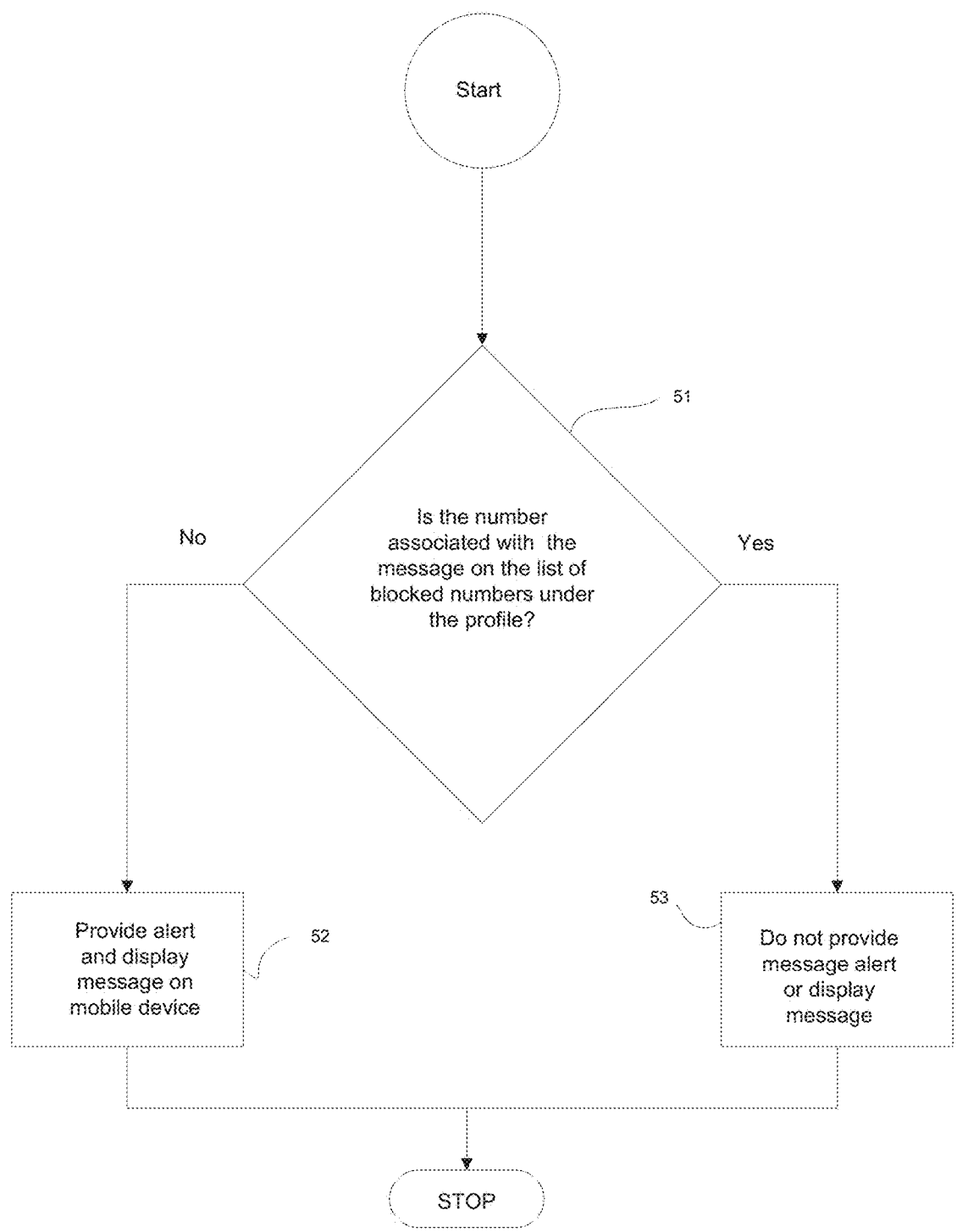
FIG. 7 is a flowchart showing processing of incoming/ outgoing calls and SMS/text messages according to example embodiments.

Some embodiments provide for blocking incoming and outgoing phone calls and incoming and outgoing text messages. Each profile may have an associated list of blocked numbers. One or more profiles may implement a common or general list of blocked numbers. FIG. 7 is a flowchart showing a process for processing incoming/outgoing SMS/text messages according to example embodiments. A request for telephony services occurs when, for example, a test message is received. At 51, the source number of the incoming message is checked against the list of blocked source numbers for the profile with which the operator is logged in. If the number is not on the list then telephony services shall proceed normally at 52, to provide the incoming SMS/text message notification and display the message. The notification may include, for example, an audible notification and/or a pop-up message on the mobile device display screen. However, if the number is on the list of blocked source numbers for the current profile then, at 53, no notification or display of the incoming text message occurs. The message is, however, still available for later access if the operator switches to a profile that allows SMS/text messages for that particular number. Outgoing SMS/text messages are handled in analogous fashion, such that telephony services are requested for an outgoing message only if the destination number of the message is not a destination number blocked by the operative profile.

Similarly, in some embodiments, a list of blocked source numbers for incoming calls according to the currently operative profile shall be checked before allowing notification to the operator that an incoming call is available. If the source number of the call is on the list, then the operator is not notified of the call nor is the call displayed on the list of incoming calls until the operator logs into a different profile that will allow incoming calls from that particular number. Outgoing calls are processed in analogous fashion. All outgoing calls are checked against a list of blocked destination numbers for the current profile, and telephony services are denied if the destination number of the call is on the list.

Figure 8:
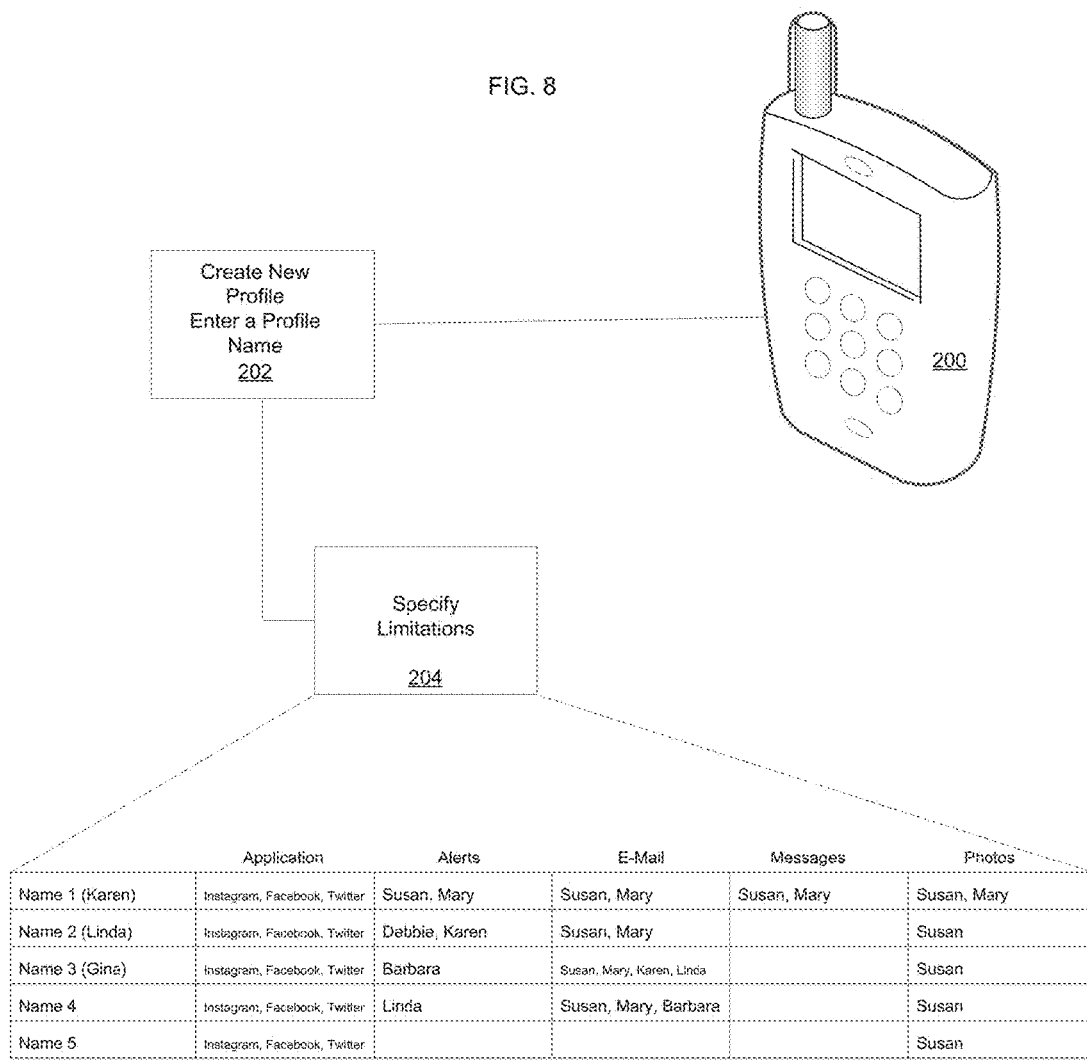
FIG. 8 diagrammatically illustrates a privacy function according to example embodiments that configures a mobile device such that selected information is not perceived while operating the mobile device under a particular profile.

FIG. 8 diagrammatically illustrates a privacy function that configures a mobile device to prevent selected information from being perceived while operating the mobile device under a selected profile according to example embodiments. In response to input at mobile device interface 200, a profile name and corresponding password are created at module 202, and individual perception limitations are specified at module 204 to carry out preferences such as indicated in table 206. Individual photos can be marked for exclusion per profile and placed into a hidden file so that the appropriately marked photos are not displayed during operation of the mobile device under the desired profile. Accordingly, a sort operation may be performed at initiation of operation under a profile so that selected photos are placed into or removed from the hidden photo file. Any visible count of available photos will not indicate the absence of photos that have been placed in the hidden file.

Figure 9:
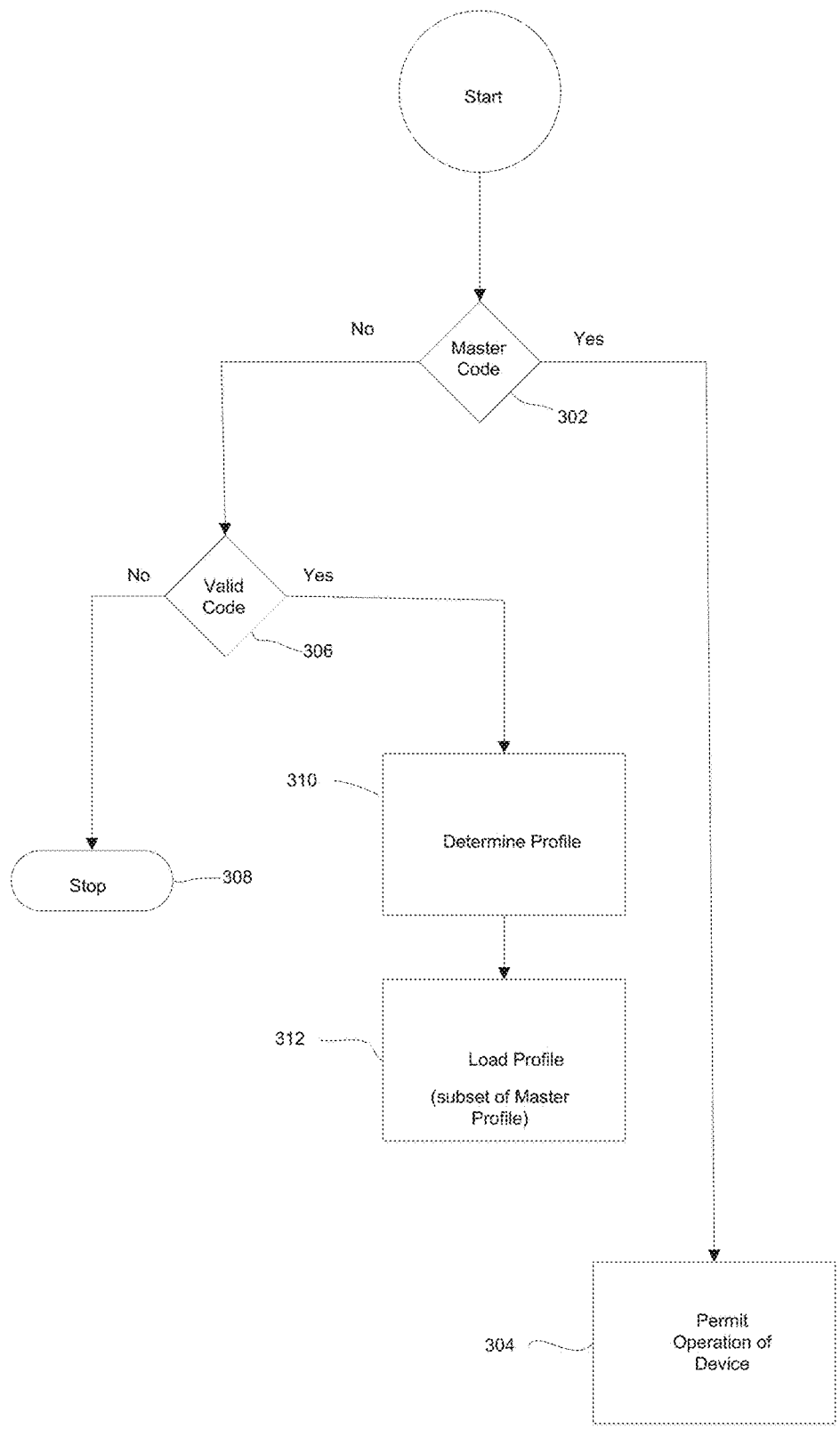
FIG. 9 is a flowchart illustrating a mobile device access code process according to example embodiments.

Device access is achieved through a typical security screen through which a password is entered and verified if correct. FIG. 9 is a flowchart illustrating a mobile device access code process according to example embodiments. A determination is made at 302 of whether a master code has been received by a mobile device for access to the device. If the master code has indeed been entered, full access to the mobile device capabilities (i.e., operation in accordance with the master profile) is allowed at step 304. Otherwise, a determination is made at step 306 of whether a valid access code for any other available profile has been received by the mobile device. If a determination that no valid access code has been entered, access to the mobile device is refused and the process halts at step 308. Should a determination be made at step 306 that a valid access code corresponding to one of the other available profiles has been entered, the profile corresponding to the received access code is determined at 310, and loaded at 312, and device access in accordance with that profile (a subset, of course, of the master profile) is allowed at step 304. While a user enters an access code into a device to select a profile, the existence of other profiles available for selection is not revealed. Consequently, there is no indication that other profiles exist for the mobile device.

In some embodiments, one or more of the profiles, each being a proper subset of the master profile, may be configured in what shall be referred to as "player mode." In player mode, the mobile communications device, such as a mobile phone, is setup so as to conceal certain information from a user of the electronic device. For instance, if the mobile phone owner is dating several people, it may be desirable during a date not to be interrupted by a girlfriend or boyfriend sending text messages or calling, especially while the communications device is in the hands of or is perceivable by the dating companion. Further, when, for instance, an owner's phone is being used/inspected by his/her date, it may be desirable for the existence of certain contacts on the phone, photos, texts messages and alerts to be imperceptible while operating the phone under a given profile. As such when the mobile phone is operated by a date under a corresponding selected player profile, the date may only see innocuous text messages, e-mail messages, photos and the like should that individual attempt to ascertain information on the mobile device, e.g., phone, etc.

In one example, should Suzie be given access to Bob's phone through use of a password corresponding to one of Bob's player profiles, Suzie may be limited to observing a truncated list of contacts which don't include Bob's other girlfriends. Additionally, Bob's phone log information including calls to and from Bob's other girlfriends may be imperceptible or excluded from view while the phone is operating under a profile determined suitable for Suzie's use. While Suzie is using Bob's phone, she may feel great comfort in having Bob's phone password and thus such a password can be readily given to Suzie. For instance, Suzie may find herself as the sole female on the list of Bob's contacts save for Bob's mother, sister and minister.

In another example of the functionality that can be derived by the subject invention, Karen the primary user, may allow Steve, Karen's boyfriend to use her phone under a selected player profile, similar to a player profile as described in the forgoing example relating to Bob. However, with the player profile in use on Karen's phone by Steve, certain social media applications such as Instagram™ Twitter™, Facebook™, etc. may not be perceivable on the phone. Associated application alerts, application messages and application contacts are likewise not perceivable by phone users, e.g., Steve, while using Karen's phone with this player profile.

In some embodiments, each of the aforementioned shells (see, e.g., 8a-8d of FIG. 2) implements a unique context for the operation of the mobile device. An application that performs a desired function or transaction may require different input parameters depending on the context of operation. As a simple illustrative example, consider an application that generates correspondence. For such an application, information such as that inserted in a letterhead will likely be different in a business context of operation than in a personal context of operation. For example, the business context may require insertion of a business address, and the personal context may require insertion of a home address which is different from the business address. A shell for the business context would therefore supply the application with parameters suitable to cause insertion of the business address, whereas a shell for the personal context would supply the application with parameters suitable to cause insertion of the home address. The business and personal shells may also supply parameters (suitably tailored in accordance with business and personal contexts of operation, respectively) to a variety of other applications on the mobile device.

In some embodiments, the context of operation of the mobile device (e.g., business or personal) is determined by a selected shell, and a selected profile (e.g., one such as described above) controls access, visibility and awareness of the applications on the mobile device. Both the shell and the profile may be associated with the user-selected password. In some embodiments, each of a plurality of profiles is available for use in conjunction with each of a plurality of available shells, and vice versa. Note, for example, that either of the aforementioned business and personal shells could even be operative in conjunction with a profile that prevents access to the aforementioned correspondence application anyway.

Figure 10:
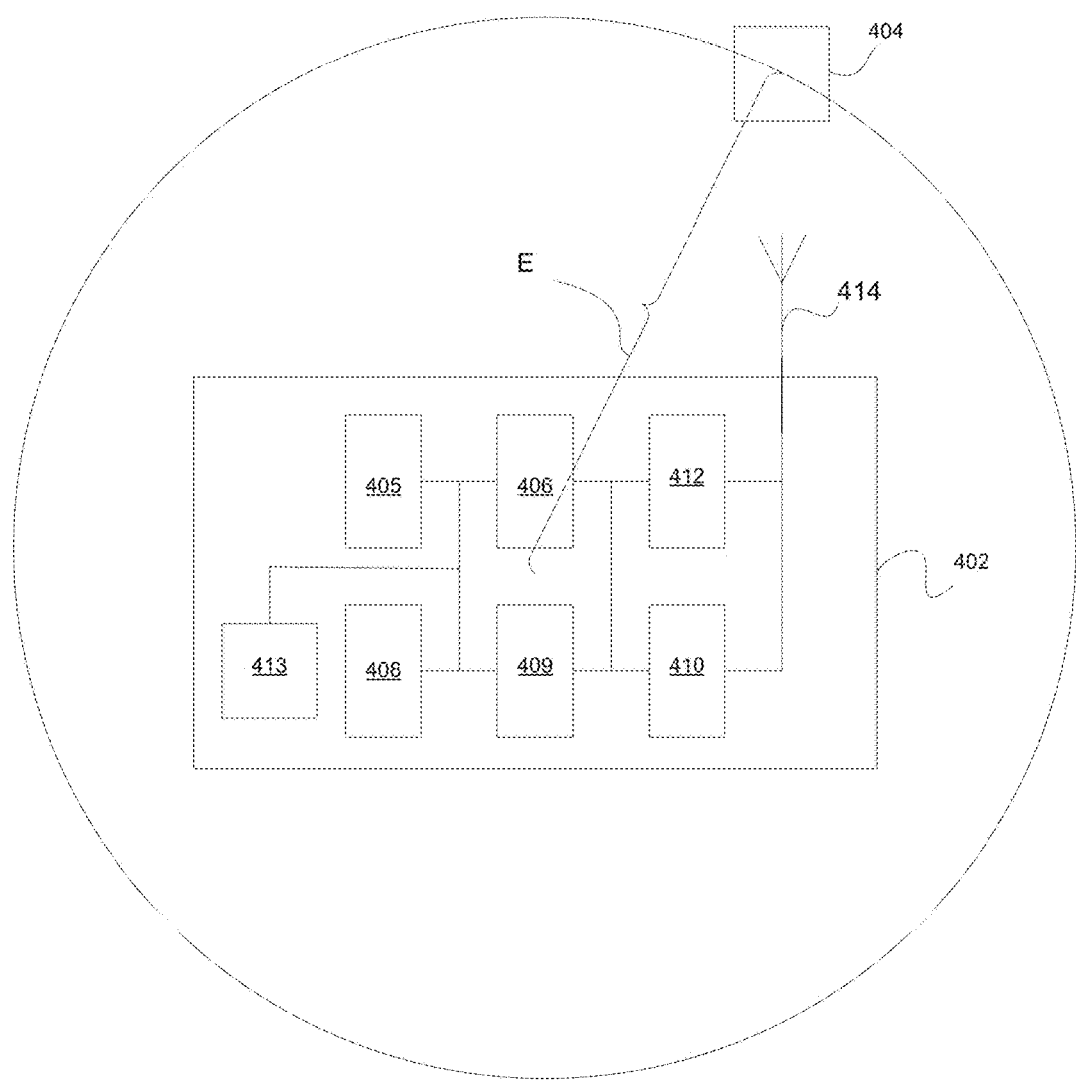
FIG. 10 illustrates a diagram representing an implementation for changing profiles in connection with using a positioning system.

In yet another embodiment use of proximity to a location associated with a particular person, proximity to a location or area or even proximity to another mobile device causes the mobile device to automatically switch profiles according to a desired preference programmed into the device. This embodiment may be realized through use of a position location system such as the Global Positioning System (GPS) with which the mobile device may avail itself through the GPS capability on the device. With reference to FIG. 10, which illustrates a diagram representing an implementation of the foregoing embodiment using a positioning system, mobile device 402, is shown near the center of circle and is spaced apart from location 404 by at least a distance represented as radius E. Mobile device 402 includes processor unit(s) 406 connected to memory unit 408. Further, a transceiver section comprising transmitter 410 and receiver 412 provide wireless connectivity for mobile device 402 thorough antenna section 414. Mobile device 402 also contains a positioning system unit 405 capable of imparting navigational/geographical positioning information to mobile device 402, Positioning system unit 405, which may represent a GPS component, is connected to processor unit(s) 406 and memory 408. Interface 416, which is connected to positioning unit 405, processor unit(s) 406 and memory 408, allows the input of settings that activate a profile change in connection with proximity to an indicated location. For instance, should mobile device 402 come within a specified distance, E, to location 404 as determined by positioning system unit 405, in connection with programming of processor unit 406, through user interface 416, a profile change is activated. For example, mobile device 402 may be programmed through memory 408 and processor unit 406 such that Profile B is activated whenever mobile device 402 comes within a distance, for instance, 5 miles, of location 404. Location 404 may correspond to a specific contact from a list of phone or mobile device contacts. The foregoing functionality helps prevent an inadvertent lapse made in switching a profile while in the company of a particular contact/individual and allows for an automatic switch of profiles. It is also contemplated that the activation of a specified profile according to location proximity may be used in connection with determining proximity to another mobile device. For instance, a switch of profiles may be set up to occur in connection with establishing a peer-to-peer link with another mobile device.

In yet another embodiment, with reference to FIG. 10, processor unit 406 causes a switch of profiles in connection with calendar 413 implemented on mobile device 402. Calendar 413 may implement calendar functions which notifiy a user of programmed scheduled events according to programming which can be held in memory 408. Appointments for calendar 413 may be synched with a clock using positioning system unit 405 (which may have a clock as determined by GPS). Processor unit 406 may be programmed such that a switch of profiles is implemented in connection with a calendar event. For instance, should a meeting with a particular contact be scheduled, a switch of profiles to a designated profile may be mandated. For example, should a 4:00 p.m. meeting on a particular date be scheduled with a party, processor unit 406 may be programmed to cause a switch of profiles to Profile A should mobile device 402 not already be operating according to Profile A.

The foregoing embodiments relating to a calendar function or a geographical positioning unit 405 may also be used to limit access to certain functionalities such as Bluetooth™ or Wi-Fi™. As such, these functionalities may be prevented at one or more locations as determined by the graphical positioning unit 405, at certain dates and times as determined by calendar 413 or while mobile device 402 is in proximity to certain other devices as determined in connection with graphical positioning unit 405.

In another embodiment, with reference still to FIG. 10, user interface 409, for mobile device 402, may include a keyboard and/or biometric sensors for the input of biometric data. For instance, user interface 409 may have a fingerprint reader or retina scanner which provides biometric data to processor unit 406 in connection with allowing access to mobile device 402's functionality after a proper biometric match of data received at user interface 409 with biometric data stored in memory 408.

In still another embodiment, proper receipt of biometric data at interface 409 may permit a change of profiles. For instance, each fingerprint, for a finger on one or each hand, may correspond to a corresponding profile. Consequently, right thumbprint may provide access to operation of mobile device 402 under Profile A while left thumbprint may provide access to operation of mobile device 402 under Profile B.

In another embodiment, while biometric data received through user interface 409 may allow access to mobile device 402 under a given profile, the biometric data does not enable a change in profiles on mobile device 402. Consequently, while biometric data received through a fingerprint reader at user interface 409 may allow access to mobile device 402 operating under a given profile or under any profile, the biometric data will not allow a user to change profiles. In this embodiment, only a keyed in password or access code will result in a change of profiles in use at mobile device 402. This allows ready access to a device using biometrics without resulting in an unintended profile change.

Processor unit 406 may be programmed accordingly, through programming held in memory 408, in order to carry out the foregoing functionality described with respect to the user interface including the biometric reader as well as with embodiments limiting access to certain connectivity functionalities such as Bluetooth™ or Wi-Fi™.

Those of skill in the art will recognize from the foregoing description that the above-described structures and functions are readily incorporated into various mobile devices having various operating systems. Examples of mobile devices include phones, tablets, etc.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-readable media by which the foregoing may be implemented may include, for example, computer executable instructions and data which cause a general purpose computer, special purpose computer, or special purpose processing device to perform a certain function or group of functions. Computer-executable instructions include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in mobile computing environments with many types of computer system configurations, including personal computers, hand-held mobile devices, multi-processor systems, microprocessor-based or programmable consumer electronics, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. Those skilled in the art will readily recognize various modifications and changes that may be made to the principles described herein without following the example embodiments and applications illustrated and described herein, and without departing from the spirit and scope of the disclosure.

The invention claimed is:

1. A mobile communication device, comprising:
a processor configured to control use of the mobile communication device in accordance with a profile selected from a plurality of profiles by a password, wherein each said profile limits at least one of user access to and user awareness of functionalities of the mobile communication device, wherein each said profile is a subset of a master profile that permits user access to and user awareness of all functionalities of the mobile communication device, wherein the selected profile limits said at least one of user access and user awareness by using a sort operation at initiation of operation according to the selected profile, and wherein the sort operation places information into a file that is hidden from the user; and
a plurality of profile memory caches, each cache for storage of a plurality of e-mail messages and e-mail message notifications for a corresponding profile.

2. The mobile communication device as recited in claim 1, each profile being distinguished by a set of preferences.

3. The mobile communication device as recited in claim 1, each profile being distinguished by a set of preferences and having the same e-mail credentials.

4. The mobile communication device as recited in claim 1, said processor being operable to change profiles in connection with proximity of the mobile communication device to a location or another wireless device.

5. The mobile communication device as recited in claim 1, said processor being further configured to limit connectivity functionality, of the mobile device under one or more profiles, in connection with proximity of the mobile communication device to a location or other device or in connection with one or more calendar events.

6. The mobile communication device as recited in claim 1, said processor being operable to change profiles in connection with a calendar appointment.

7. The mobile communication device as recited in claim 1 including a display coupled to said processor, wherein said processor is further configured to generate on said display a user interface for profile selection, wherein said user interface prevents user awareness of at least one of the profiles during selection of the selected profile.

8. The mobile communication device as recited in claim 1 wherein one of the profiles conceals information that includes contacts, software applications, alerts, notifications, text messages and e-mail messages.

9. The mobile communication device as recited in claim 1 further including a user interface, to the mobile communication device, said user interface including a biometric reader being operable to receive biometric data for use in allowing user access to the mobile communication device.

10. The mobile communication device as recited in claim 9 wherein said biometric reader is selected from the group of readers selected from a fingerprint reader and a retina scanner.

11. The mobile communication device as recited in claim 1 further including a user interface, to the mobile communication device, said user interface including a biometric reader being operable to receive biometric data for use in allowing user access to the mobile communication device but not to change profiles on the device.

12. The mobile communication device as recited in claim 11 wherein said biometric reader is selected from the group of readers selected from a fingerprint reader and a retina scanner.

13. A method performed on a mobile communication device including a method for changing e-mail accessibility from a current profile to a new profile, comprising:

controlling use of the mobile communication device in accordance with selecting, by a password, one of a plurality of profiles;

wherein each said profile from said plurality of profiles limits at least one of user access to and user awareness of functionalities of the mobile communication device, and wherein each said profile is a subset of a master profile that permits user access to and user awareness of all functionalities of the mobile communication device;

wherein the selected profile limits said at least one of user access and user awareness by using a sort operation at initiation of operation; and copying a system e-mail cache to a respective profile memory cache corresponding to the current profile and thereafter, deleting the system e-mail cache;

copying the new profile memory cache to the system e-mail cache and activating e-mail preferences for the new profile.

14. The method as recited in claim 13, wherein one of said profiles prevents user access to one or more applications.

15. The method as recited in claim 13, wherein one of said profiles prevents user access to one or more data items.

16. The method as recited in claim 13 wherein one of said profiles prevents user awareness of one or more applications.

17. The method as recited in claim 13, wherein one of said profiles prevents user awareness of one or more data items.

18. The method as recited in claim 13, wherein one of said profiles prevents one of user access to and user awareness of one or more applications, and prevents one of user access to and user awareness of one or more data items.

* * * * *